United States Patent [19]

Satoh

[11] Patent Number: 5,074,585
[45] Date of Patent: Dec. 24, 1991

[54] AIR BAG IN AIR BAG EQUIPMENT

[75] Inventor: Takeshi Satoh, Shiga, Japan

[73] Assignee: Takata Corporation, Tokyo, Japan

[21] Appl. No.: 563,647

[22] Filed: Aug. 7, 1990

[30] Foreign Application Priority Data

Aug. 11, 1989 [JP] Japan .................................. 1-209283

[51] Int. Cl.$^5$ .............................................. B60R 21/20
[52] U.S. Cl. .................................. 280/743; 280/731; 280/732
[58] Field of Search ............... 280/728, 729, 731, 732, 280/743

[56] References Cited

U.S. PATENT DOCUMENTS 4,941,678  7/1990  Lauritzen et al. .................... 280/732
4,964,654  10/1990  Bishop et al. ........................ 280/743

Primary Examiner—Kenneth R. Rice
Attorney, Agent, or Firm—Armstrong, Nikaido, Marmelstein, Kubovcik & Murray

[57] ABSTRACT

In the air bag according to the present invention, pouches 1g are furnished at least along a part of an opening 1d to introduce reaction gas from an inflator, and band-like ring member 1e' mounted on car body and having the plane in the direction approximately perpendicular to the cross-section of the opening 1d is inserted into the pouches 1g.

Therefore, the plane of the band-like ring member 1e' runs approximately in parallel to the direction of the introduced reaction gas, and the band-like ring member 1e' is not enlarged in the direction perpendicular to the direction of the introduced reaction gas. As the result, the module can be designed in smaller size. Also, by furnishing the pouches 1g on the periphery of the opening and by inserting the band-like ring member 1e' into the pouches 1g, the number of the base cloths of the air bag can be reduced by one cloth.

4 Claims, 4 Drawing Sheets

FIG. 2

AIR BAG IN AIR BAG EQUIPMENT

BACKGROUND OF THE INVENTION

The present invention relates to an air bag found in air bag equipment. The air bag is inflated by high pressure reaction gas from an inflator and protects the occupant when the vehicle is in a collision and in particular to a mounting portion of such an air bag.

The air bag equipment furnished on the fixed portion of the car body in front of a seat in a vehicle plays an important role in the protection of the occupant in the vehicle as it is inflated instantaneously in an emergency, such as a vehicle collision, by the pressure of reaction gas, released from an inflator fixed on the steering wheel or dashboard.

As shown in FIG. 7 and FIG. 8, the air bag 1 in a conventional type of air bag equipment comprises a first base cloth 1a constituting an upper wall and a lower wall, a second and a third base cloths 1b and 1c constituting left and right lateral walls, a ring-like metal fitting 1e disposed on the periphery of an opening 1d, through which reaction gas from an inflator (not shown) is introduced, and a fourth base cloth 1f to fix the ring-like metal fitting 1e on the periphery of the opening 1d. As shown in FIG. 9, the ring-like metal fitting 1e is made of a plate provided with an opening 1d' at its center.

By fixing this ring-like metal fitting 1e on a retainer 2, which is mounted on the fixed portion of car body such as a dashboard, the air bag 1 is mounted on the car body.

In such an air bag 1, the ring-like metal fitting 1e in planar shape is arranged in such a manner that its planar surface runs in the direction perpendicular to the direction of the introduced reaction gas. Therefore, it is unavoidable that ring-like metal fitting 1e is enlarged to all directions, i.e. upward and downward, leftward and rightward. The enlargement of the ring-like metal fitting 1e necessarily leads to the enlargement of the module of air bag equipment.

Also, in the conventional type air bag, the number of base cloths constituting the air bag is as many as 4, and this means that many working processes are required for manufacture.

SUMMARY OF THE INVENTION

It is an object of this invention to offer an air bag, which can provide a small size module for air bag equipment.

It is another object of this invention to reduce the number of base cloths of the air bag.

To solve the above problems, the air bag of the present invention is characterized in that a) pouches are furnished along the opening of reaction gas of the air bag, b) a band-like ring member is provided to mount the air bag and has a surface approximately in parallel to the direction of the introduced reaction gas to the pouches, and c) a band-like ring member is mounted on a retainer fixed on the car body together with the peripheral portion of the opening of the air bag.

Also, the air bag of this invention is characterized in that the band-like ring member is made of a pair of U-shaped members and that these U-shaped members are disposed in the form of a ring.

Further, the air bag of this invention is characterized in that the band-like ring member is made of a pair of L-shaped members and that these L-shaped members are disposed in the form of a ring.

Further, the air bag of the invention is characterized in that the band-like ring member is made of 4 pieces of band-like plates, and that these band-like plates are disposed in the form of a ring.

In the air bag according to this invention with the above arrangement, the flat surface of the band-like ring member is approximately in parallel to the direction of reaction gas introduced from the inflator, and the band-like ring member is not enlarged extensively in the direction perpendicular to the direction of the introduced reaction gas. Accordingly, it is possible to reduce the size of the module.

Also, by furnishing pouches on the periphery of the opening of the air bag and by inserting the ring-like member into the pouches, it is possible to reduce the number of the base cloths of the air bag by one cloth.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 7:
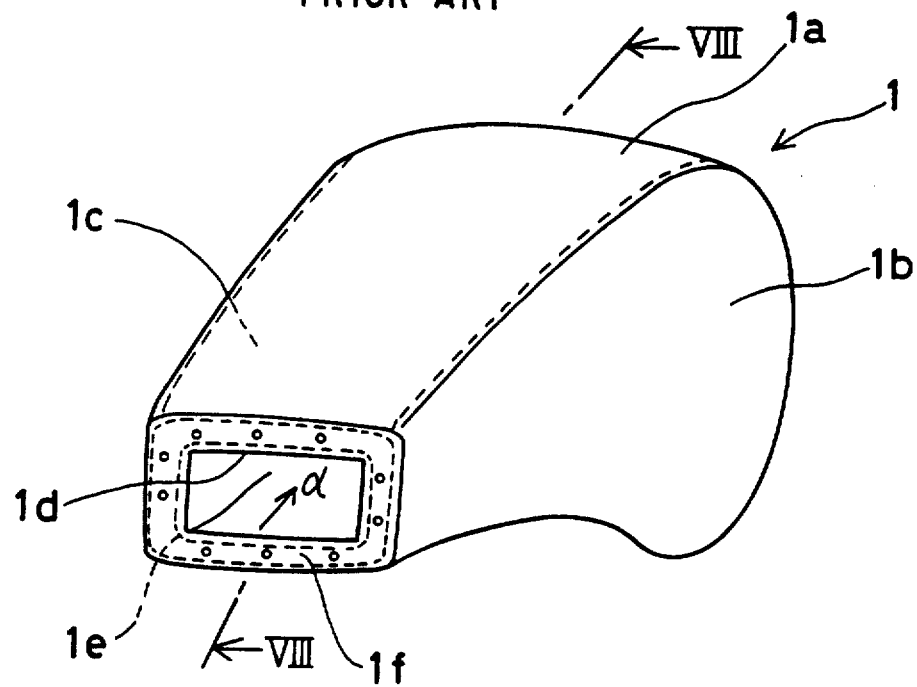
FIG. 7 is a perspective view of a conventional type air bag.

In the following, description is given on the embodiments of this invention in connection with the drawings. Because the same number refers to the same component as in the air bag 1 of FIG. 7, the description of each component parts is not given here.

Figure 1:
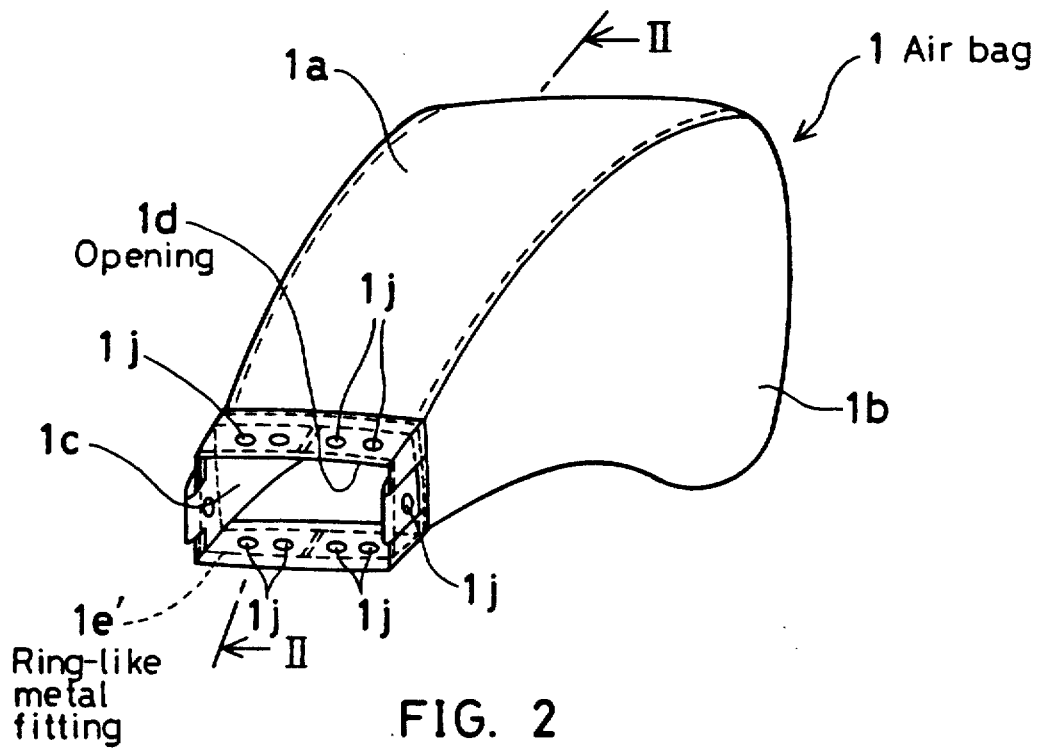
FIG. 1 is a perspective view of an embodiment of an air bag according to this invention.
Figure 4:
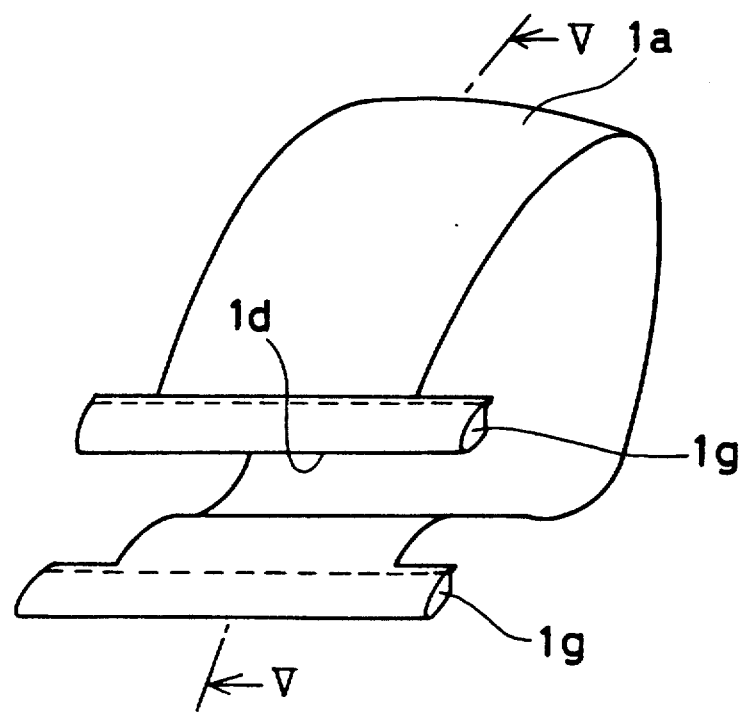
FIG. 4 is a perspective view of a first base cloth of the air bag.
Figure 5:
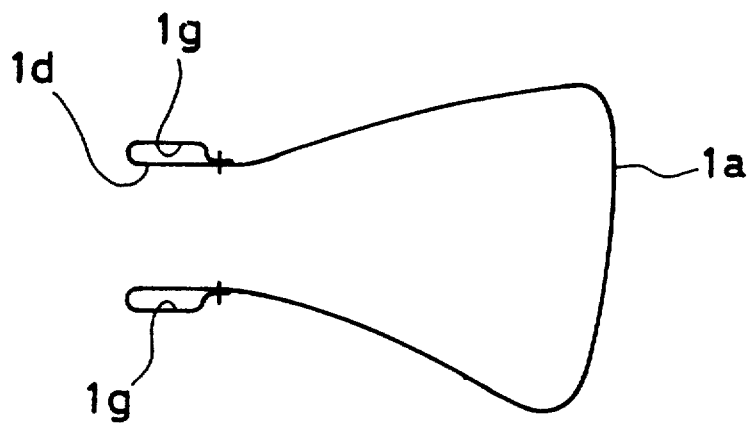
FIG. 5 is a sectional view of the first base cloth along the line V—V of FIG. 4.
Figure 6:
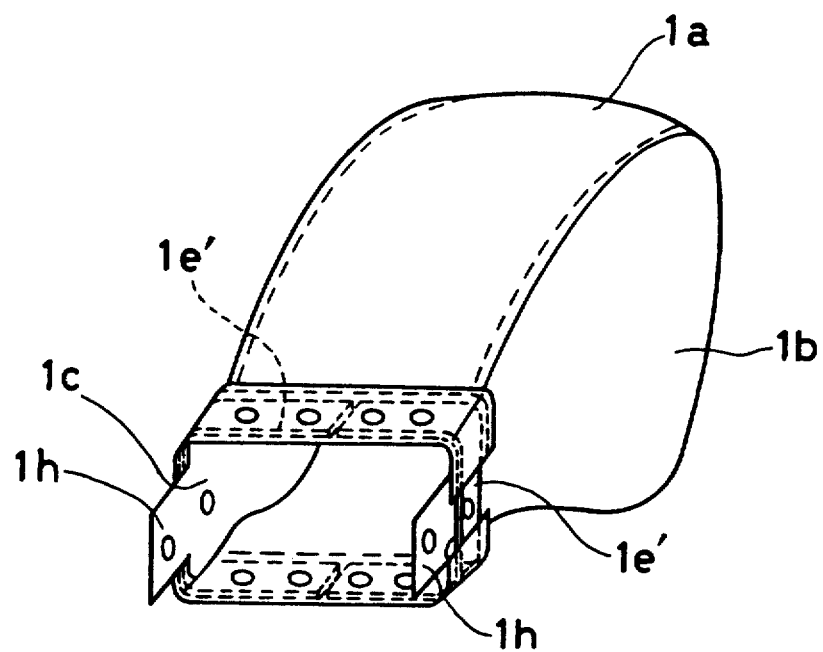
FIG. 6 is a perspective view of the air bag under assembly.

As shown in FIG. 1, the air bag 1 comprises a first base cloth 1a bent upward and downward and forming an upper wall and a lower wall, and a second and a third base cloths 1b and 1c being bonded together with the first base cloth 1a by sewing, bonding or welding and forming left and right lateral walls respectively. The air bag is formed in the shape of a bag by the first to the third base cloths 1a to 1c, and an opening 1d is formed on one end. As shown in FIG. 4 and FIG. 5, both ends of the first base bag 1a, forming the opening 1d, are bent, and the bent portion is bonded with the first base cloth 1a, and a pouch 1g is formed. Also, as shown in FIG. 6, the ends of the second and the third base cloths 1b and 1c, forming the opening 1d, have a lug 1h respectively.

On the other hand, the ring-like metal fitting 1e' to mount the air bag 1 is composed of two members 1i and 1i, each of which consists of band-like plates in two-piece structure, and each of the members 1i and 1i is formed by bending band-like plate in U-shape. As given in FIG. 1 and FIG. 6, each of the U-shaped members 1i and 1i is inserted into the pouches 1g and 1g of the first base cloth 1a. The lugs 1h and 1h of the second and the third base cloths 1b and 1c pass inside these U-shaped members 1i and 1i and are bent by about 180 degrees as if they cover the gaps between a pair of U-shaped members 1i and 1i. By such an arrangement, the air leakage from this gap is minimized. Also, by designing the ring-like metal fitting 1e' in two-piece construction, the ring-like metal fitting 1e' can be easily mounted on the base cloths.

A certain number of mounting holes 1j, 1j, . . . are provided on these U-shaped members 1i, and 1i, the pouches 1g and 1g, and the lugs 1h and 1h.

Figure 2:
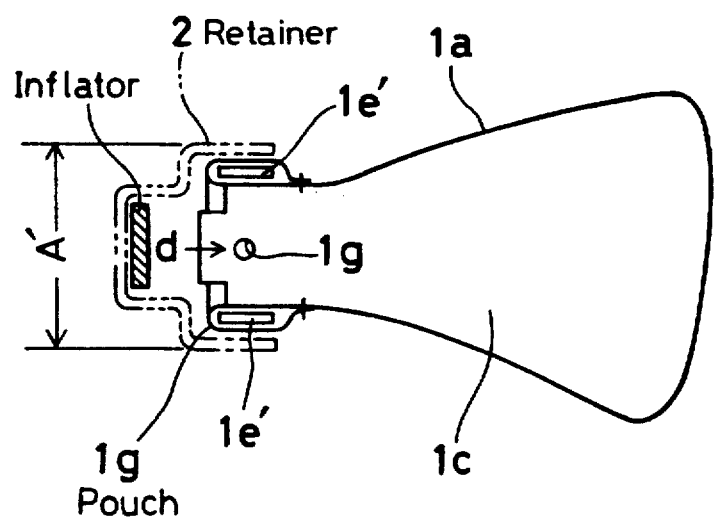
FIG. 2 is a sectional view along the line II—II in FIG. 1.
Figure 3:
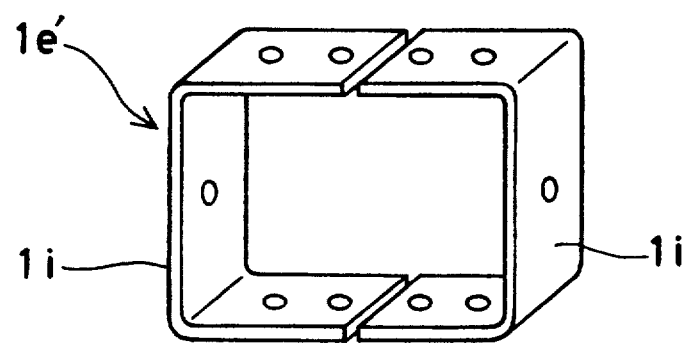
FIG. 3 shows a ring-like metal fitting to be used in the air bag.

Thus, a pair of U-shaped members 1i and 1i assembled on the first base cloth 1a are formed in the shape of a ring, and it is arranged that these planes are disposed approximately in parallel to the direction of the reaction gas to be introduced. As shown in FIG. 2, the ring-like member 1e' is fixed on the retainer 2 on the fixed portion of the car body, such as a dashboard, together with the peripheral portion of the opening 1d of the air bag by means of rivets.

Figure 8:
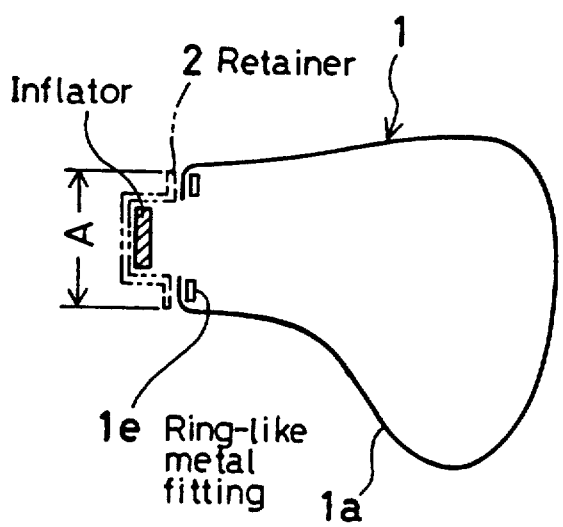
FIG. 8 is a sectional view of the air bag along VIII—VIII of FIG. 7.
Figure 9:
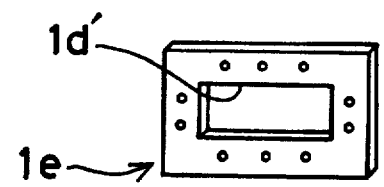
FIG. 9 is a perspective view of a conventional type ring-like metal fitting.

In the air bag 1 of the present embodiment, the surface of the ring-like member 1e' extends approximately in parallel to the direction a of reaction gas to be introduced. Thus, the vertical dimension A' is not enlarged too much. Namely, the dimension A' is far smaller than the vertical dimension A (FIG. 8) of conventional type ring-like metal fitting 1e, which extends toward the direction perpendicular to the direction a of the reaction gas to be introduced. Similarly, the lateral dimension is also smaller. Accordingly, it is possible to mount the ring-like metal fitting 1e' on the side of the retainer 2 and to provide a small size module for air bag equipment.

In case such an air bag 1 is used in the air bag equipment for the seat of an assistant driver, mounted on the dashboard, for instance, the air bag 1 of this embodiment can be easily mounted in a small space, although the space below the dashboard is relatively small because a glove box and other objects are furnished there.

Also, because ring-like metal fitting 1e' is inserted into the pouch 1g formed on a lateral end of the opening 1d of the first base cloth 1a, there is no need to furnish the fourth base cloth 1f, which is required to mount the conventional type ring-like metal fitting 1e. Namely, the number of the base cloths for the air bag 1 can be reduced by one cloth.

The present invention is not limited to the above embodiment, and various modifications and variations are conceivable.

For example, in the above embodiment, band-like ring member is made of a pair of U-shaped members, while it may be composed by a pair of L-shaped members, or by 4 pieces of band-like plates.

As it is evident from the above description, the surface of the band-like ring member, on which the air bag is mounted, runs approximately in parallel to the direction of the reaction gas introduced, the band-like member is not extensively enlarged in the direction perpendicular to the direction of the introduced reaction gas. Therefore, the module can be designed in smaller size.

By forming the pouches on the periphery of the opening to introduce reaction gas of the air bag, and by inserting the ring-like members of two-piece structure from lateral direction, it is possible to reduce the number of air bag base cloths by one cloth. This means the reduction of the manufacturing processes for the air bag. Thus, productivity is improved, and the reliability is increased because the bonding portions are minimized by the reduction of the number of base cloths.

Further, package volume is minimized because there are less overlappings of base cloths.

What we claim is:

1. An air bag in air bag equipment, having an opening to introduce reaction gas from an inflator in an emergency and inflated by said reaction gas from said inflator, said air bag comprising:

pouches formed at least along a part of said opening; and band-like ring member having an elongated surface extending in a direction approximately perpendicular to a cross-section of said opening and mounted on a car body, said band-like ring member is inserted into said pouches.

2. An air bag according to claim 1, wherein said band-like ring member is formed by a pair of U-shaped members disposed in a form of a ring.

3. An air bag according to claim 1, wherein said band-like ring member is formed by a pair of L-shaped members disposed in a form of a ring.

4. An air bag according to claim 1, wherein said band-like ring member is formed by four pieces of band-like plates disposed in a form of a ring.

* * * * *

REEXAMINATION CERTIFICATE (2595th)
United States Patent [19]
Satoh

[11] B1 5,074,585
[45] Certificate Issued Jun. 6, 1995

[54] AIR BAG IN AIR BAG EQUIPMENT

[75] Inventor: Takeshi Satoh, Shiga, Japan

[73] Assignee: Takata Corporation, Tokyo, Japan

Reexamination Request:
No. 90/003,465, Jun. 13, 1994

Reexamination Certificate for:
Patent No.: 5,074,585
Issued: Dec. 24, 1991
Appl. No.: 563,647
Filed: Aug. 7, 1990

[30] Foreign Application Priority Data

Aug. 7, 1990 [JP] Japan .................. 1-209283

[51] Int. Cl.$^6$ ............................................. B60R 21/20
[52] U.S. Cl. .................. 280/743 A; 280/731; 280/732
[58] Field of Search ............... 280/728 R, 728 A, 731, 280/732, 743 R, 743 A

[56] References Cited
U.S. PATENT DOCUMENTS

| | | | |
|---|---|---|---|
| 1,536,121 | 5/1925 | Meyer | 383/34 |
| 2,083,138 | 6/1937 | Becker | 383/2 |
| 2,714,911 | 8/1955 | Fontana | 383/33 |
| 4,815,866 | 3/1989 | Martone | 383/34.1 |
| 4,817,828 | 4/1989 | Goetz | 222/3 |
| 4,842,300 | 6/1989 | Ziomek et al. | 280/732 |

*Primary Examiner*—Kenneth R. Rice

[57] ABSTRACT

In the air bag according to the present invention, pouches 1g are furnished at least along a part of an opening 1d to introduce reaction gas from an inflator, and band-like ring member 1e' mounted on car body and having the plane in the direction approximately perpendicular to the cross-section of the opening 1d is inserted into the pouches 1g.

Therefore, the plane of the band-like ring member 1e' runs approximately in parallel to the direction of the introduced reaction gas, and the band-like ring member 1e' is not enlarged in the direction perpendicular to the direction of the introduced reaction gas. As the result, the module can be designed in smaller size. Also, by furnishing the pouches 1g on the periphery of the opening and by inserting the band-like ring member 1e' into the pouches 1g, the number of the base cloths of the air bag can be reduced by one cloth.

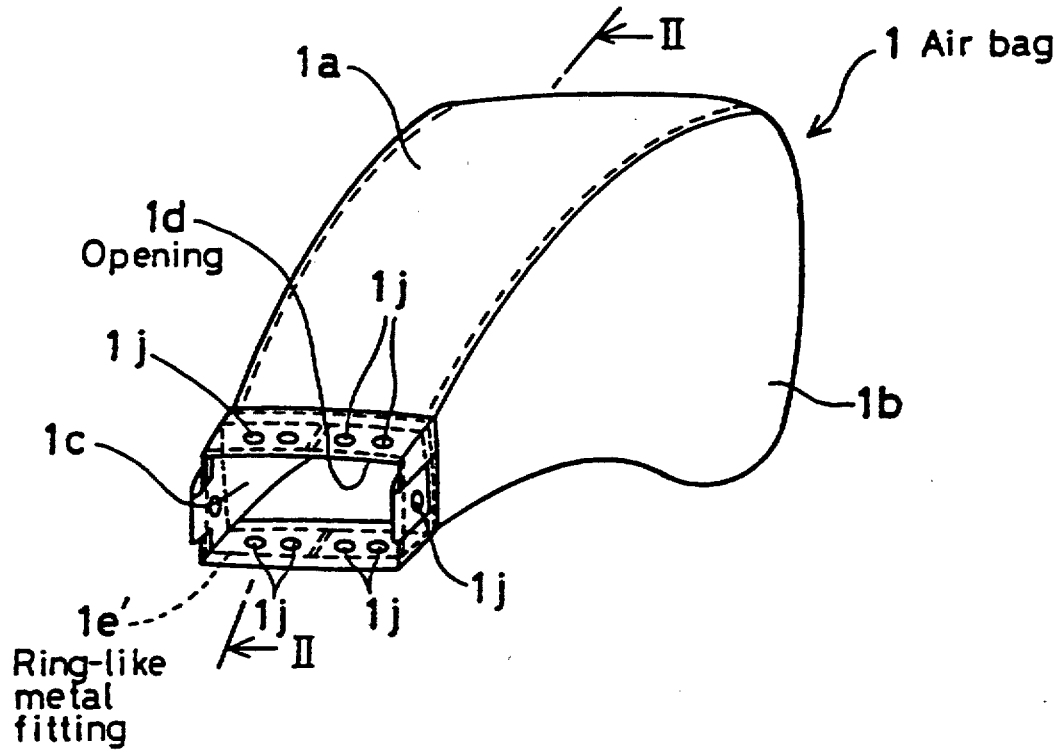

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3 and 4 are cancelled.

Claim 1 is determined to be patentable as amended.

1. An air bag in air bag equipment, having an opening to introduce reaction gas from an inflator in an emergency and inflated by said reaction gas from said inflator, said air bag comprising:
   a first side panel;
   second and third side panels connected to said first side panel;
   pouches, *integral to said first side panel,* formed at least along [a part] *first opposing sides* of said opening *and along portions of second opposing sides of said opening, said first opposing sides and said portions of said second opposing sides being contiguous to each other;* [and]
   *a first lug piece integral to an end portion of said second side panel;*
   *a second lug piece integral to an end portion of said third side panel, said first and second lug pieces forming a loop around said portions of second opposing sides of said opening;*
   band-like ring member having an elongated surface extending in a direction approximately perpendicular to a cross-section of said opening and mounted on a car body, said band-like ring member is inserted into said pouches.

* * * * *